(12) United States Patent
Chen et al.

(10) Patent No.: US 10,139,556 B1
(45) Date of Patent: Nov. 27, 2018

(54) BACKLIGHT STRUCTURE

(71) Applicant: CHUNGHWA PICTURE TUBES, LTD., Taoyuan (TW)

(72) Inventors: Pin-Chu Chen, Changhua County (TW); Lun-Wei Kang, Taoyuan (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 0 days.

(21) Appl. No.: 15/834,029

(22) Filed: Dec. 6, 2017

(30) Foreign Application Priority Data

Nov. 6, 2017 (CN) .................... 2017 2 1461904 U

(51) Int. Cl.
*G02B 6/00* (2006.01)
*F21V 8/00* (2006.01)

(52) U.S. Cl.
CPC ......... *G02B 6/0088* (2013.01); *G02B 6/0051* (2013.01); *G02B 6/0053* (2013.01)

(58) Field of Classification Search
CPC ... G02B 6/0088; G02B 6/0051; G02B 6/0053
USPC ....................................................... 362/606
See application file for complete search history.

(56) References Cited

U.S. PATENT DOCUMENTS

2017/0371094 A1* 12/2017 Lee .................... G02B 6/0088

FOREIGN PATENT DOCUMENTS

TW     I380078 B    12/2012
TW     I522694 B    2/2016

* cited by examiner

*Primary Examiner* — Daniel A Hess
(74) *Attorney, Agent, or Firm* — CKC & Partners Co., Ltd.

(57) ABSTRACT

A backlight structure includes a frame body, a light guide plate, a first optical film, a second optical film, and a fixed member. The frame body has a first frame edge and a second frame edge opposite thereto. The light guide plate is disposed in the frame body and has a first and second short border corresponding respectively to the first frame edge and the second frame edge. The light guide plate has a protrusion protruding from an upper surface of the light guide plate and being adjacent to the second short border. The optical films are disposed over the light guide plate and include a first and second short-edge portion disposed respectively over the first short border and the second short border. The second short-edge portion has a notch matching the protrusion. The fixed member fixes the frame body and the optical films.

10 Claims, 4 Drawing Sheets

BACKLIGHT STRUCTURE

RELATED APPLICATION

This application claims priority to China Application Serial Number 201721461904.X, filed Nov. 6, 2017, which is herein incorporated by reference.

BACKGROUND

Field of Invention

The present disclosure relates to a backlight structure. More particularly, the present disclosure relates to a backlight structure which is applied to the display device.

Description of Related Art

In recent years, liquid crystal display (LCD) devices are broadly utilized in consumer electronic products or computer products, such as portable televisions, mobile phones, notebooks, and desktop displays, because LCD devices have advantages of high displaying quality, small volume, light weight, low driving voltage, low power consumption, and widespread application. The liquid crystal display devices have replaced the cathode ray tube (CRT), and have become the mainstream of display devices.

The backlight structure is an important component of the LCD devices. Because liquid crystal itself cannot emit light, typical LCD devices usually need to include backlight structures. A conventional backlight structure employs a frame and a rear plate engaged with each other to fix a light guide plate and optical films therein, and a double-side adhesive is manually arranged between the light guide plate and the rear plate. Nowadays, the requirements for vibration and drop tests of the backlight structure, however, are getting higher, and thus conventional shockproof design has been not enough. The frame is usually made of plastic material which is poor in rigidity, and therefore the frame cannot effectively reduce the displacement between the light guide plate and the optical film when the light guide plate and the optical film are vibrated. As a result, the light guide plate and the optical film are easily scratched sue to the vibration. In addition, the rear plate is usually made of rigid metal, and therefore the light guide plate is easily broken when the light guide plate is subjected to an impact-drop test.

SUMMARY

The present disclosure provides a backlight structure. The backlight structure disclosed herein may reduce the noise and the interference due to the extension or shrink of the components, and may reduce the friction between the light guide plate and the films thereon to avoid damage to the surface of the light guide plate.

The present disclosure provides a backlight structure, which includes a frame body, a light guide plate, a first optical film, a second optical film, and a fixed member. The frame body has a first frame edge and a second frame edge opposite thereto. An upper edge of the first frame edge has a depression. The light guide plate is disposed in the frame body. The light guide plate has a first short border and a second short border opposite thereto. The first short border and the second short border correspond respectively to the first frame edge and the second frame edge. The light guide plate has at least one protrusion protruding from an upper surface of the light guide plate and being adjacent to the second short border. The first optical film is disposed in the frame body and disposed over the light guide plate. The first optical film includes a first short-edge portion and a second short-edge portion disposed respectively over the first short border and the second short border of the light guide plate. The first short-edge portion includes a first notch shrunk from the first short-edge portion in a direction to the second short-edge portion. A first extending portion and a second extending portion located at opposite sides of the first notch. The second short-edge portion has at least one second notch matching the protrusion. The second optical film is disposed in the frame body and disposed over the first optical film. The second optical film includes a third short-edge portion and a fourth short-edge portion disposed respectively over the first short-edge portion and the second short-edge portion. The third short-edge portion includes a third notch shrunk from the third short-edge portion in a direction to the fourth short-edge portion. A third extending portion and a fourth extending portion are located at opposite sides of the third notch. The fourth short-edge portion has at least one fourth notch matching the protrusion. The third notch exposes a portion of the first extending portion and a portion of the second extending portion. The fixed member covers and fixes the exposed portion of the first extending portion, the exposed portion of the second extending portion, a portion of the third extending portion, and a portion of the fourth extending portion. The fixed member extends to an outer sidewall of the first frame edge.

In some embodiments of the present disclosure, the at least one protrusion includes a plurality of protrusions.

In some embodiments of the present disclosure, the protrusions are evenly distributed on the second short border.

In some embodiments of the present disclosure, a top surface area of each protrusion accounts for about 0.2% to about 0.8% of an area of the upper surface of the light guide plate.

In some embodiments of the present disclosure, a sum of a top surface of the protrusions accounts for about 2% to about 5% of an area of the upper surface of the light guide plate.

In some embodiments of the present disclosure, the backlight structure further includes a third optical film, which is disposed in the frame body and disposed on the light guide plate. The third optical film is disposed between the light guide plate and the first optical film. The third optical film includes a fifth short-edge portion and a sixth short-edge portion disposed respectively over the first short border and the second short border of the light guide plate. The sixth short-edge portion has at least one fifth notch matching the protrusion. A top surface of the third optical film is level with a lower edge of the depression of the frame body.

In some embodiments of the present disclosure, the fifth notch is aligned with the second notch and the fourth notch is aligned with the second notch.

In some embodiments of the present disclosure, the second notch has an edge spaced apart from the protrusion by a gap.

In some embodiments of the present disclosure, the first notch is shrunk from the first short-edge portion in a direction to the second short-edge portion by a first distance, and the third notch is shrunk from the third short-edge portion in a direction to the fourth short-edge portion by a second distance, wherein the second distance is greater than or equal to the first distance.

In some embodiments of the present disclosure, a top surface of the protrusion is level with a top surface of the second optical film.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
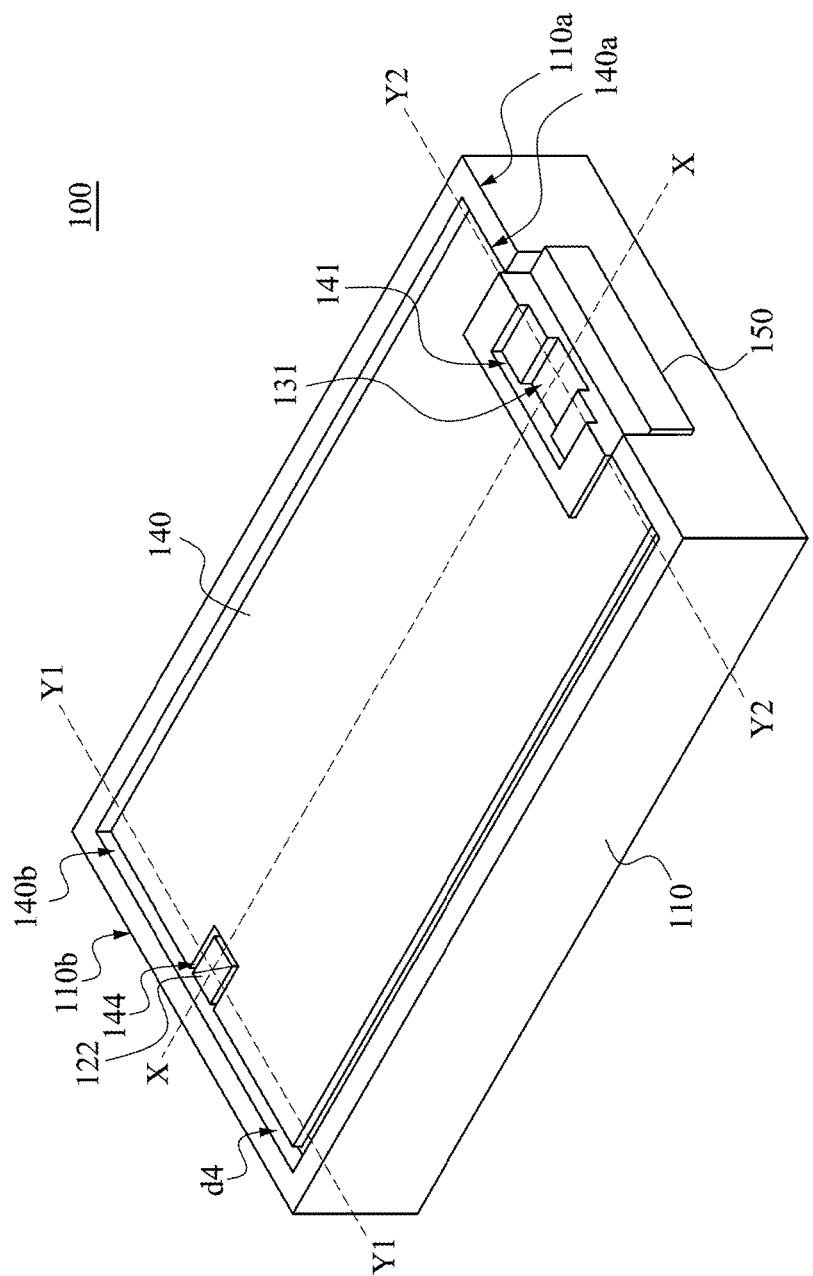
FIG. 1 is a perspective schematic view of backlight structure in accordance with various embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
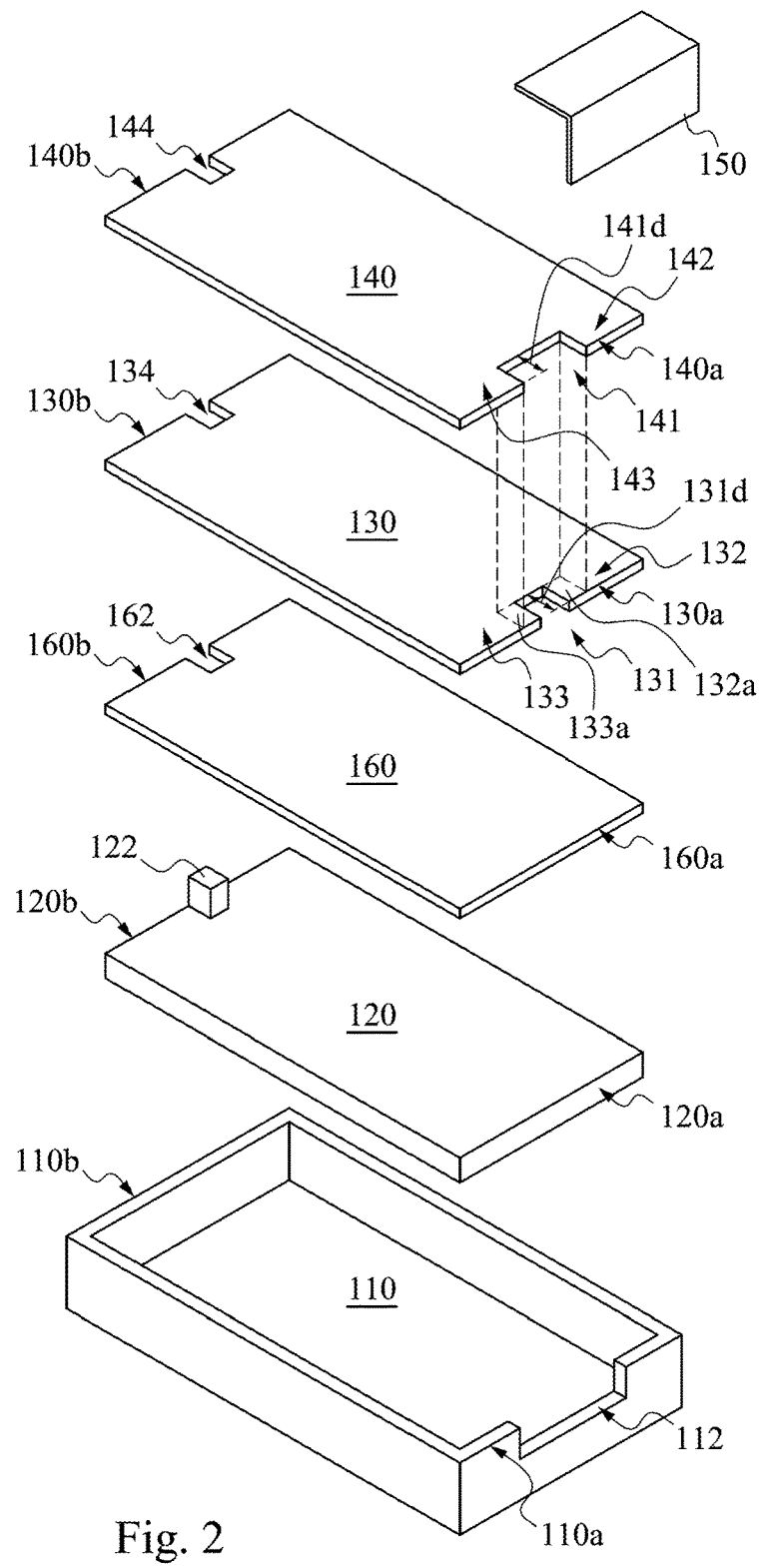
FIG. 2 is an explosion schematic view of backlight structure of FIG. 1.

FIG. 1 is a perspective view illustrating a backlight structure 100 in accordance with various embodiments of the present disclosure. FIG. 2 is a perspective explosion schematic view illustrating the backlight structure 100 of FIG. 1. The backlight structure 100 includes a frame body 110, a light guide plate 120, a first optical film 130, a second optical film 140, and a fixed member 150. The frame body 110 has a first frame edge 110a and a second frame edge 110b opposite thereto. An upper edge of the first frame edge 110a has a depression 112. To be specific, the frame body 110 includes a floor and a peripheral frame edge. The peripheral frame edge is disposed on the floor and surrounds the edges of the floor to define an accommodation space, which may accommodate the light guide plate 120, an optical film set (130 and 140), a reflective sheet (not shown), and a back light source (not shown). In some embodiments, examples of the material of the frame body 110 include metal such as aluminum or stainless steel, such as SUS430 series stainless steel, SUS304 series stainless steel, and SGLC series stainless steel.

Referring to FIG. 1 and FIG. 2, the light guide plate 120 is disposed in the frame body 110. The light guide plate 120 has a first short border 120a and a second short border 120b opposite thereto. The first short border 120a and the second short border 120b respectively correspond to the first frame edge 110a and the second frame edge 110b. The light guide plate 120 has at least one protrusion 122 protruding from an upper surface of the light guide plate 120 and adjacent to the second short border 120b. In some embodiments, the at least one protrusion 122 may be plurality of protrusions 122, for example, the number of the protrusions 122 may be 2 or more. The protrusions 122 may be evenly distributed on the second short border 120b of the light guide plate 120. More specifically, the protrusions 122 are disposed in the shading area of the liquid crystal display (not shown). In one embodiment, a top surface area of a single protrusion 122 accounts for about 0.2% to about 0.8% of the top surface area of the light guide plate 120. For example, the top surface area of a single protrusion 122 accounts for 0.3%, 0.4%, 0.5%, 0.6%, or 0.7% of the top surface area of the light guide plate 120. In various embodiments, a sum of the top surface of the plurality of the protrusions 122 accounts for about 2% to about 5% of the area of the upper surface of the light guide plate 120. According to various embodiments, when the sum of the top surface of the protrusions 122 is greater than a certain percentage value of the area of the light guide plate 120, such as 5%, the protrusions 122 may extend beyond the shading area of the liquid crystal display panel, thereby unfavorably affecting the light outputting quality. On the contrary, when the sum of the top surface of the protrusions 122 is less than a certain percentage value of the area of the light guide plate 120, such as 2%, it is insufficient to restrict the sliding of the optical films subsequently disposed thereon. Therefore, the sum of the top surface of the protrusion 122 may account for 2.2%, 2.4%, 2.6%, 2.8%, 3.0%, 3.2%, 3.4%, 3.6%, 3.8%, 4.0%, 4.2%, 4.4%, 4.6%, or 4.8% of the area of the light guide plate 120. In some embodiments, the material of the light guide plate 120 may include poly (methyl methacrylate) (PMMA) or polycarbonate (PC).

Referring to FIG. 1 and FIG. 2, the first optical film 130 is disposed in the frame body 110 and over the light guide plate 120. The first optical film 130 includes a first short-edge portion 130a and a second short-edge portion 130b disposed respectively over the first short border 120a and the second short border 120b of the light guide plate 120. The first short-edge portion 130a includes a first notch 131 shrunk from the first short-edge portion 130a in a direction to the second short-edge portion 130b and a first extending portion 132 and a second extending portion 133 located at opposite sides of the first notch 131. The second short-edge portion 130b has at least one second notch 134, which matches the protrusion 122 on the second short border 120b. To be specific, the protrusion 122 correspondingly wedges into the second notch 134 so as to effectively limit the sliding distance of the first optical film 130 in a horizontal direction, thereby avoiding the damage to the surface of the light guide plate and the generation of noises. In some embodiments, the first optical film 130 is an upper prism sheet and the material thereof may include polyethylene terephthalate (PET).

Referring to FIG. 1 and FIG. 2, the second optical film 140 is disposed in the frame body 110 and over the first optical film 130. The second optical film 140 includes a third short-edge portion 140a and a fourth short-edge portion 140b disposed respectively over the first short-edge portion 130a and the second short-edge portion 130b. The third short-edge portion 140a includes a third notch 141 shrunk from the third short-edge portion 140a in the direction to the fourth short-edge portion 140b and a third extending portion 142 and a fourth extending portion 143 located at opposite sides of the third notch 141. The fourth short-edge portion 140b has at least one fourth notch 144, which matches the protrusion 122. To be specific, the protrusion 122 is correspondingly wedges into the fourth notch 144 to effectively limit the sliding distance of the second optical film 140 in a horizontal direction, thereby avoiding the damage to the surface of the light guide plate and the generation of noises. It is noted that the first notch 131 has a first notch width and the third notch 141 has a second notch width, wherein the second notch width is greater than the first notch width. Therefore, the third notch 141 exposes a portion 132a of the first extending portion 132, a portion 133a of the second extending portion 133, and the first notch 131. In some embodiments, the first notch 131 is shrunk from the first short-edge portion 130a in a direction to the second short-edge portion 130b by a first distance 131d, and the third notch 141 is shrunk from the third short-edge portion 140a in a direction to the fourth short-edge portion 140b by a second distance 141d, wherein the second distance 141d is greater than or equal to the first distance 131d. In some embodiments, the second optical film 140 is a diffuser film, and the material thereof may include polyethylene terephthalate (PET).

In some embodiments, the backlight structure 100 may further include a third optical film 160 disposed in the frame body 110 and over the light guide plate 120. The third optical film 160 is interposed between the light guide plate 120 and the first optical film 130. The third optical film 160 includes a fifth short-edge portion 160a and a sixth short-edge portion 160b disposed respectively over the first short border 120a and the second short border 120b of the light guide plate 120. The sixth short-edge portion 160b has at least one fifth notch 162 which matches the protrusion 122. To be specific, the protrusion 122 correspondingly wedges into the fifth notch 162 to effectively limit the sliding distance of the third optical film 160 in a horizontal direction, thereby avoiding the damage to the surface of the light guide plate and the generation of noises. It is noted that the third notch 141 is at least partially overlapped with the first notch 131, and a portion of the upper surface of the third optical film 160 is exposed through the third notch 141 and the first notch 131. In some embodiments, the third optical film 160 is a diffuser film, and the material thereof may include polyethylene terephthalate (PET).

In other embodiments, the backlight structure 100 may include a fourth optical film (not shown), which is disposed in the frame body 110 and over the light guide plate 120. The fourth optical film is interposed between the third optical film 160 and the first optical film 130. The fourth optical film includes a seventh short-edge portion (not shown) and an eighth short-edge portion (not shown) disposed respectively over the first short border 120a and the second short border 120b of the light guide plate 120. The seventh short-edge portion includes a sixth notch (not shown) shrunk from the seventh short-edge portion in a direction to the eighth short-edge portion and a fifth extending portion (not shown) and a sixth extending portion (not shown) located at opposite sides of the sixth notch. The eighth short-edge portion has at least one seventh notch (not shown) which matches the protrusion 122. To be specific, the protrusion 122 correspondingly wedges into the seventh notch to effectively limit the sliding distance of the fourth optical film in a horizontal direction, thereby avoiding the damage to the surface of the light guide plate and the generation of noises. It is noted that the sixth notch has a third notch width (not shown), wherein the second notch width is greater than the first notch width and the first notch width is greater than the third notch width. Therefore, the first notch 131 exposes a portion of the fifth extending portion, a portion of the sixth extending portion, and the sixth notch and the sixth notch exposes a portion of the upper surface of the third optical film 160. In some embodiments, the sixth notch is shrunk from the sixth short-edge portion in a direction to the eighth short-edge portion by a third distance (not shown), wherein the second distance 141d is greater than or equal to the first distance 131d and the first distance 131d is greater than or equal to the third distance. In some embodiments, the fourth optical film is a lower prism sheet, and the material thereof may include polyethylene terephthalate (PET).

Referring to FIG. 1 and FIG. 2, the fixed member 150 covers and fixes the exposed portion 132a of the first extending portion 132, the exposed portion 133a of the second extending portion 133, a portion of the third extending portion 142, and a portion of the fourth extending portion 143. In addition, the fixed member 150 also extends to an outer sidewall of the first frame edge 110a. In other words, the first and the second optical films 130 and 140 are affixed to the frame body 110 by the fixed member 150 in order to limit the sliding distance of the optical films, thereby avoiding the interference between the optical films due to the sliding therebetween. In other embodiments, the fixed member 150 may further extend to cover a portion of the top surface of the second optical film 140 to increase the adhesion area of the fixed member 150. In some embodiments, the fixed member 150 is a single-side adhesive tape, for example, the single-side adhesive tape may be a black single-side adhesive tape or a white single-side adhesive tape.

In the embodiment including the third optical film 160 and the fourth optical film (not shown) mentioned above, the first optical film 130, the second optical film 140, the third optical film 160, and the fourth optical film (not shown) are affixed to the frame body 110 by the fixed member 150 in order to limit the sliding distance of the optical films, thereby avoiding the interference between the optical films due to the sliding therebetween. It is noted that the seventh notch (not shown) is aligned with the fifth notch 162, the fifth notch 162 is aligned with the second notch 134, and the fourth notch 144 is aligned with the second notch 134. It can be understood that a vertical projection of the seventh notch on the light guide plate 120, a vertical projection of the second notch 134 on the light guide plate 120, a vertical projection of the fourth notch 144 on the light guide plate 120, and a vertical projection of the fifth notch 162 on the light guide plate 120 coincide with each other.

Figure 3:
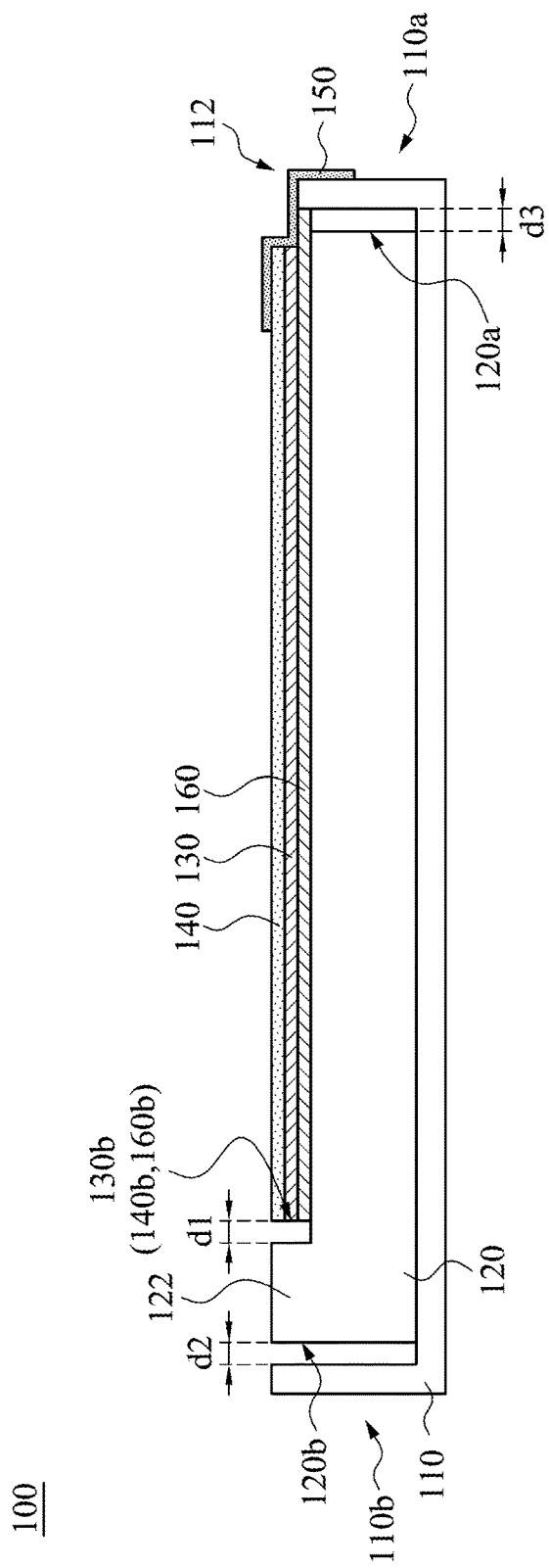
FIG. 3 is a cross-sectional schematic view along line X-X of FIG. 1.
Figure 5:
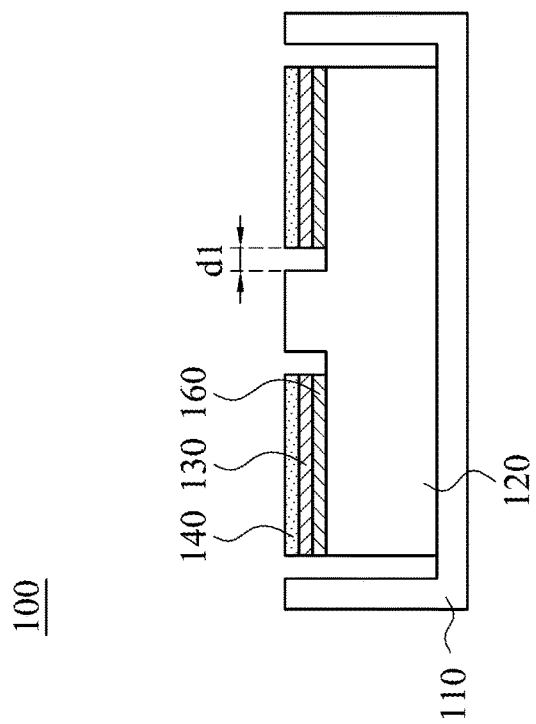
FIG. 5 is a cross-sectional schematic view along line Y2-Y2 of FIG. 1.
Figure 4:
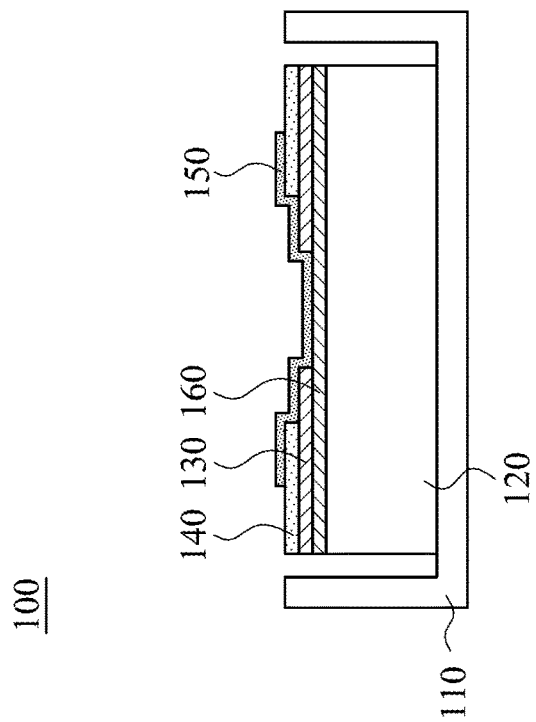
FIG. 4 is a cross-sectional schematic view along line Y1-Y1 of FIG. 1.

FIG. 3 is a cross-sectional schematic view along line X-X of FIG. 1. FIG. 4 is a cross-sectional schematic view along line Y1-Y1 of FIG. 1. FIG. 5 is a cross-sectional schematic view along line Y2-Y2 of FIG. 1. Referring to FIG. 3 through FIG. 5, a first gap d1 is present between the protrusion 122 and the edges of the second notch 134, the fourth notch 144, and the fifth notch 162. A second gap d2 is present between the second short border 120b of the light guide plate 120 and the second frame edge 110b of the frame body 110. A third gap d3 is present between the first short border 120a of the light guide plate 120 and the first frame edge 110a of the frame body 110. In some embodiments, the second short-edge portion 130b of the first optical film 130 is aligned with the fourth short-edge portion 140b of the second optical film 140. In the embodiment including the third optical film 160 and the fourth optical film (not shown) mentioned above, the second short-edge portion 130b of the first optical film 130 is aligned with the sixth short-edge portion 160b of the third optical film 160, and the second short-edge portion 130b of the first optical film 130 is also aligned with the eighth short-edge portion of the fourth optical film. In various embodiments, a fourth gap d4 (shown in FIG. 1) is present between the second short-edge portion 130b of the first optical film 130 and the second frame edge 110b of the frame body 110. To be specific, the materials of the frame body 110, the light guide plate 120, the first optical film 130, the second optical film 140, the third optical film 160, and the fourth optical film (not shown) may expand or shrink as the ambient temperature changes, and therefore the design sizes of the gaps d1, d2, d3, and d4 may depend on the materials of the frame body 110, the light guide plate 120, the first optical film 130, the second optical film 140, the third optical film 160, and the fourth optical film. For example, the frame body 110 may be made of SUS304 series stainless steel, SGLC series stainless steel, SUS430 series stainless steel, or Al, that respectively have a thermal expansion coefficient ranged from about $7.3 \times 10^{-6}$ mm/° C. to about $27.3 \times 10^{-6}$ mm/° C., from about $2 \times 10^{-6}$ mm/° C. to about $22 \times 10^{-6}$ mm/° C., from about $3.2 \times 10^{-6}$ mm/° C. to about $23.2 \times 10^{-6}$ mm/° C., and from about $16 \times 10^{-6}$ mm/° C. to about $36 \times 10^{-6}$ mm/° C.; the light guide plate 120 is made of PC or PMMA, that respectively have a thermal expansion coefficient ranged from about $57.5 \times 10^{-6}$ mm/° C. to about $77.5 \times 10^{-6}$ mm/° C. and from about $50 \times 10^{-6}$ mm/° C. to about $70 \times 10^{-6}$ mm/° C.; the first optical film 130 may be made of PET, and the thermal expansion coefficient thereof is about $31.03 \times 10^{-6}$ mm/° C. to about $51.03 \times 10^{-6}$ mm/° C.; the second optical film 140 may be made of PET, and the thermal expansion coefficient thereof is about $25 \times 10^{-6}$ mm/° C. to about $45 \times 10^{-6}$ mm/° C.; the third optical film 160 may be made of PET, and the thermal expansion coefficient thereof is about $25 \times 10^{-6}$ mm/° C. to about $45 \times 10^{-6}$ mm/° C.; and the fourth optical film may be made of PET, and the thermal expansion coefficient thereof is about $31.03 \times 10^{-6}$ mm/° C. to about $51.03 \times 10^{-6}$ mm/° C. While the space of the gaps d1, d2, d3, and/or d4 is insufficient, the wrinkles or the local uplifts may be produced on the surfaces of the optical films 130, 140, and 160 and/or the surface of the light guide plate 120.

Referring to FIG. 3, in some embodiments, the top surface of the third optical film 160 is level with the lower edge of the depression 112 of the frame body 110. Namely, the top surface of the third optical film 160 and the lower edge of the depression 112 of the frame body 110 collectively form a substantially flat surface. This design makes the operation of adhering the fixed member 150 onto the optical films 130, 140, and 160 and the frame body 110 become relatively easier. In addition, in some other embodiments, the top surface of the protrusion 122 is level with the top surface of the second optical film 140. In other words, the backlight structure 100 has a substantially flat top surface, thereby improving the qualities of displayed image and the appearance.

Although the present disclosure has been described in considerable detail with reference to certain embodiments thereof, other embodiments are possible. Therefore, the spirit and scope of the appended claims should not be limited thereto the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A backlight structure, comprising:
   a frame body having a first frame edge and a second frame edge opposite thereto, an upper edge of the first frame edge having a depression;
   a light guide plate disposed in the frame body, the light guide plate having a first short border and a second short border opposite thereto, the first short border and the second short border corresponding respectively to the first frame edge and the second frame edge, the light guide plate having at least one protrusion protruding from an upper surface of the light guide plate and being adjacent to the second short border;
   a first optical film disposed in the frame body and disposed over the light guide plate, the first optical film comprising a first short-edge portion and a second short-edge portion disposed respectively over the first short border and the second short border of the light guide plate, wherein the first short-edge portion comprises a first notch shrunk from the first short-edge portion in a direction to the second short-edge portion and a first extending portion and a second extending portion located at opposite sides of the first notch, and the second short-edge portion has at least one second notch matching the protrusion;
   a second optical film disposed in the frame body and disposed over the first optical film, the second optical film comprising a third short-edge portion and a fourth short-edge portion disposed respectively over the first short-edge portion and the second short-edge portion, wherein the third short-edge portion comprises a third notch shrunk from the third short-edge portion in a direction to the fourth short-edge portion and a third extending portion and a fourth extending portion located at opposite sides of the third notch, and the fourth short-edge portion has at least one fourth notch matching the protrusion, wherein the third notch exposes a portion of the first extending portion and a portion of the second extending portion; and
   a fixed member covering and fixing the exposed portion of the first extending portion, the exposed portion of the second extending portion, a portion of the third extending portion, and a portion of the fourth extending portion, and the fixed member extending to an outer sidewall of the first frame edge.

2. The backlight structure of claim 1, wherein the at least one protrusion comprises a plurality of protrusions.

3. The backlight structure of claim 2, wherein the protrusions are evenly distributed on the second short border.

4. The backlight structure of claim 2, wherein a top surface area of each protrusion accounts for about 0.2% to about 0.8% of an area of the upper surface of the light guide plate.

5. The backlight structure of claim 2, wherein a sum of top surfaces of the protrusions accounts for about 2% to about 5% of an area of the upper surface of the light guide plate.

6. The backlight structure of claim 1, further comprising a third optical film disposed in the frame body and disposed on the light guide plate, the third optical film disposed between the light guide plate and the first optical film, the third optical film comprising a fifth short-edge portion and a sixth short-edge portion disposed respectively over the first short border and the second short border of the light guide plate, wherein the sixth short-edge portion has at least one fifth notch matching the protrusion, and a top surface of the third optical film is level with a lower edge of the depression of the frame body.

7. The backlight structure of claim 6, wherein the fifth notch is aligned with the second notch, and the fourth notch is aligned with the second notch.

8. The backlight structure claim 1, wherein the second notch has an edge spaced apart from the protrusion by a gap.

9. The backlight structure of claim 1, wherein the first notch is shrunk from the first short-edge portion in the direction to the second short-edge portion by a first distance, and the third notch is shrunk from the third short-edge portion in the direction to the fourth short-edge portion by a second distance, wherein the second distance is greater than or equal to the first distance.

10. The backlight structure of claim 1, wherein a top surface of the protrusion is level with a top surface of the second optical film.

* * * * *